(12) United States Patent
White

(10) Patent No.: US 8,960,613 B2
(45) Date of Patent: Feb. 24, 2015

(54) TUBE INTERCONNECTION SYSTEM

(75) Inventor: Russell W. White, Austin, TX (US)

(73) Assignee: Lynx Toys, LLC, Bryan, TX (US)

(*) Notice: Subject to any disclaimer, the term of this patent is extended or adjusted under 35 U.S.C. 154(b) by 260 days.

(21) Appl. No.: 13/099,477

(22) Filed: May 3, 2011

(65) Prior Publication Data

US 2012/0280490 A1 Nov. 8, 2012

(51) Int. Cl.
*F16L 3/08* (2006.01)
*A63H 23/10* (2006.01)
*A63B 31/00* (2006.01)
*F16B 2/08* (2006.01)
*F16B 7/04* (2006.01)
*F16B 21/08* (2006.01)

(52) U.S. Cl.
CPC ............... *A63H 23/10* (2013.01); *A63B 31/00* (2013.01); *A63B 2208/03* (2013.01); *F16B 2/08* (2013.01); *F16B 7/0493* (2013.01); *F16B 21/082* (2013.01)
USPC .......................................... 248/74.1; 248/70

(58) Field of Classification Search
USPC ........... 248/74.1, 49, 51, 62, 65, 68.1, 69, 70, 248/71, 74.3, 229.17, 230.8, 229.2, 229.25, 248/229.26; 24/335, 336, 339, 341
See application file for complete search history.

(56) References Cited

U.S. PATENT DOCUMENTS

| | | | | |
|---|---|---|---|---|
| 2,723,431 A * | 11/1955 | Di Renzo | ......................... | 24/301 |
| 4,688,961 A * | 8/1987 | Shioda et al. | ................. | 403/389 |
| 4,817,897 A * | 4/1989 | Kreusel | ......................... | 248/68.1 |
| 5,687,458 A * | 11/1997 | Coker | ............................. | 24/336 |
| 7,413,153 B1 * | 8/2008 | Ghormley | ................... | 248/229.2 |
| 7,931,650 B2 * | 4/2011 | Winquist et al. | ................. | 606/59 |
| 8,083,432 B2 * | 12/2011 | Limpert | ......................... | 403/389 |
| 2002/0037193 A1 | 3/2002 | Gibbons et al. | | |
| 2005/0098695 A1 * | 5/2005 | Hollenbeck | .............. | 248/229.26 |
| 2005/0098697 A1 * | 5/2005 | Collins | ..................... | 248/231.71 |
| 2010/0224737 A1 * | 9/2010 | LaFontaine et al. | ............ | 248/70 |

FOREIGN PATENT DOCUMENTS

| | | | | |
|---|---|---|---|---|
| JP | 07286610 A | * 10/1995 | .............. | F16B 35/00 |
| JP | 09-112509 | 5/1997 | | |
| JP | 2008-151245 | 7/2008 | | |
| KR | 20-0427193 | 9/2006 | | |

OTHER PUBLICATIONS

International Searching Authority, "Notification of Transmittal of the International Search Report and the Written Opinion of the International Searching Authority," mailed Dec. 26, 2012, in International application No. PCT/US2012/036104.

* cited by examiner

Primary Examiner — Alfred J Wujciak
(74) Attorney, Agent, or Firm — Trop, Pruner & Hu, P.C.

(57) ABSTRACT

A tube interconnection system is disclosed that includes multiple interconnection components having base portions and one or more band connection systems. The interconnection components can be configured to interact to be in a coupled state. To this end, a ratcheting mechanism can be configured to releasably hold the first interconnection component and the second interconnection component in various rotated positions relative to one another in the coupled state.

7 Claims, 11 Drawing Sheets

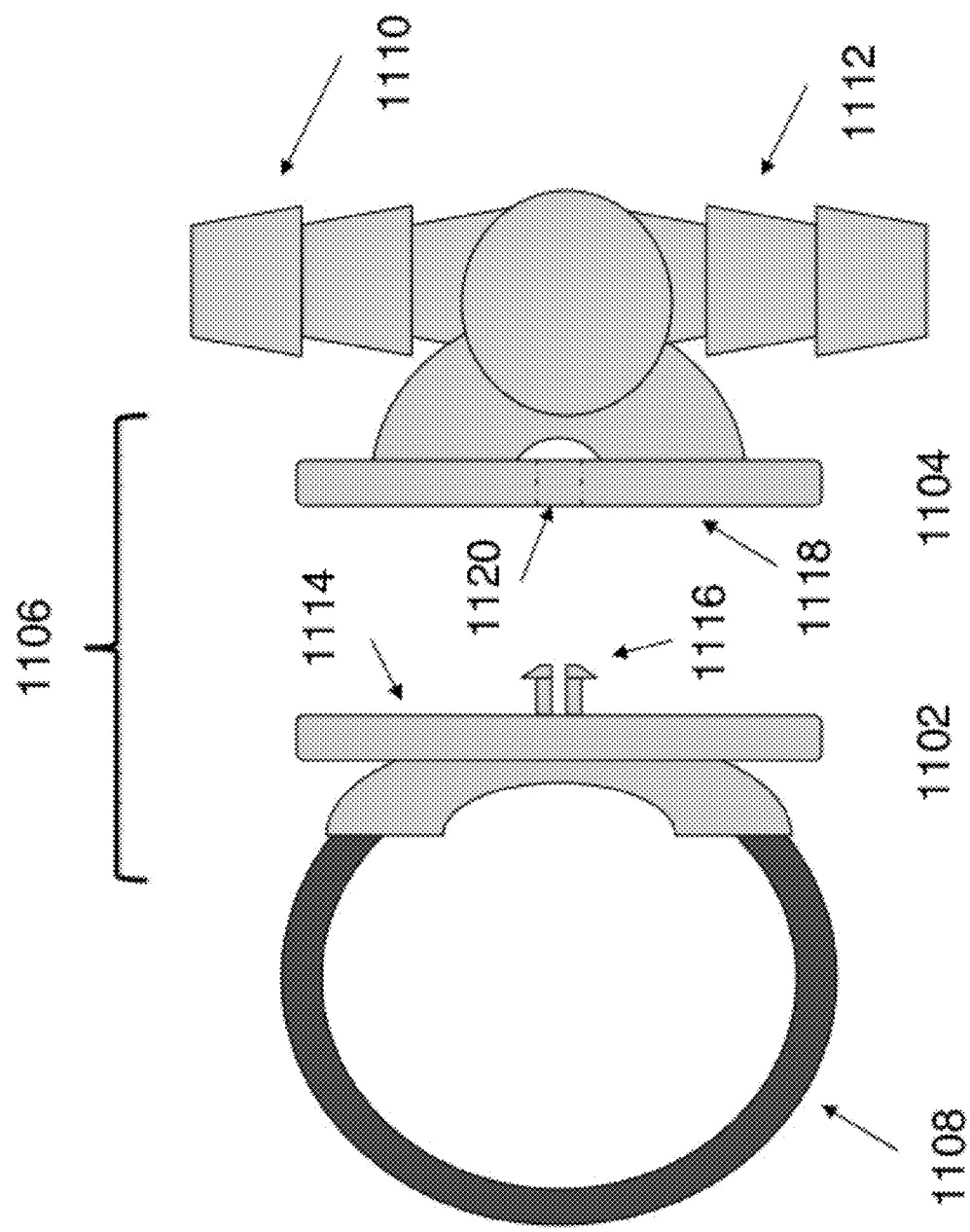

TUBE INTERCONNECTION SYSTEM

TECHNICAL FIELD

The following disclosure relates to a tube interconnection system and more particularly to an interconnection system for foam tubes such as those used for fun and/or flotation in pools and other bodies of water.

BACKGROUND

In recent years, tubes made of closed-cell foam have become a popular pool toy. Typically, these tubes (occasionally referred to as "Noodles") are about forty-five to sixty inches long, have a diameter of about 2.5 to 4.5 inches, and are formed to have a hollow cylinder cross section, a solid cylinder cross section, or some other cross section. These long, soft, foam tubes are often used as floatation devices by children or as an inexpensive pool toy. Unfortunately, the available uses for pool Noodles is limited. As such, a solution is needed that expands the play and use options for these common pool toys.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 11 depicts two component parts of an interconnection system that incorporates teachings of the present disclosure where one component includes a banding mechanism and the other includes two ribbed tube inserts.

DETAILED DESCRIPTION

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. Moreover, other teachings can be utilized in this disclosure, and the teachings disclosed herein can be utilized in other applications and with several different types of devices and purposes.

Figure 1:
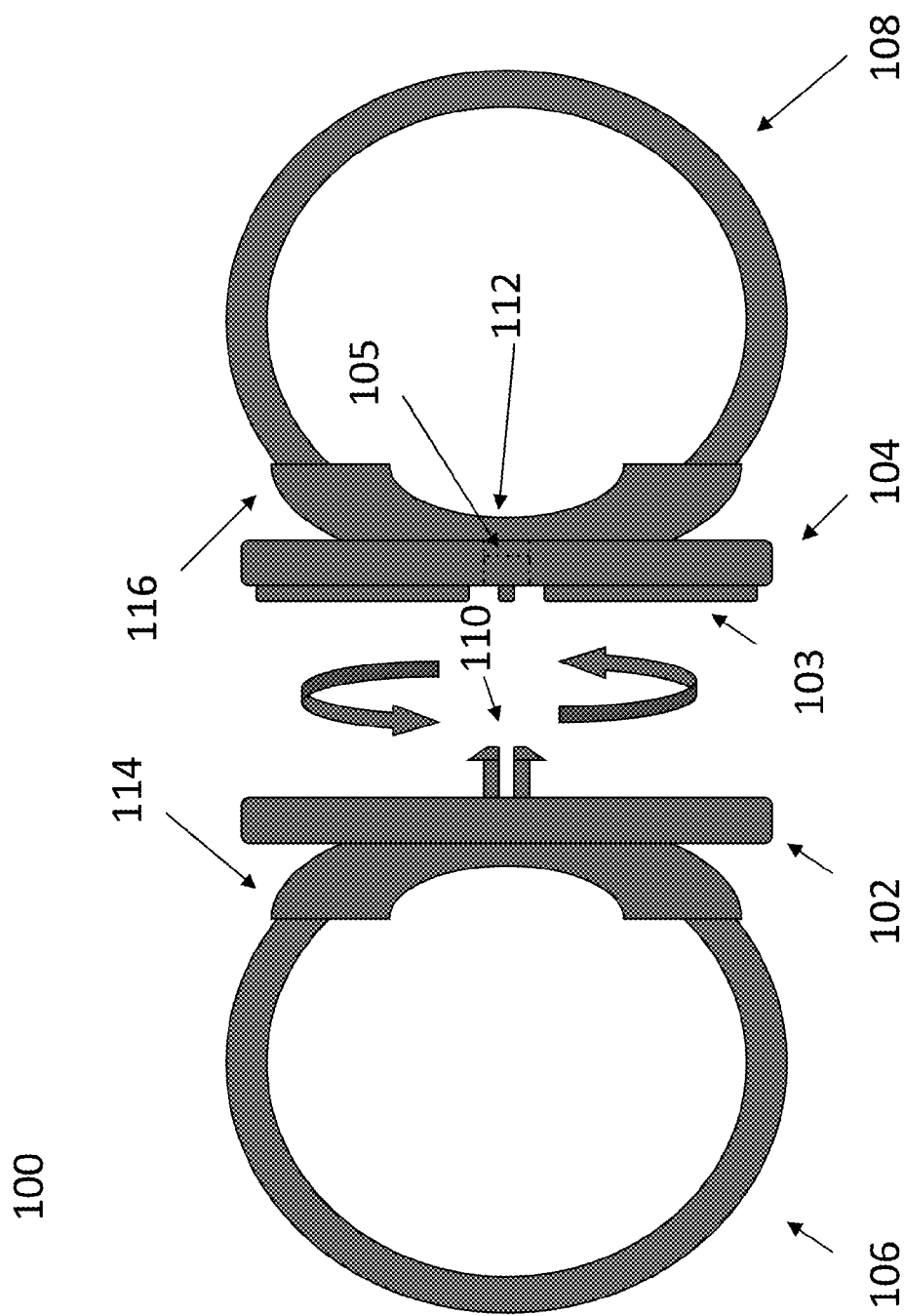
FIG. 1 depicts one example of a tube interconnection system that incorporates teachings of the present disclosure.

The items depicted in FIGS. 1-11 are illustrative and are not intended to represent an exhaustive display of the component parts a designer may use to create a tube interconnection system that incorporates teachings from the present disclosure. As mentioned above in the Brief Description of the Drawings, FIG. 1 depicts one example of a tube interconnection system 100 that incorporates teachings of the present disclosure.

System 100 includes two bases 102, 104, which may be formed in several ways and from several different types of materials. For example, a designer may want to form bases 102 and 104 out of ABS plastic (acrylonitrile butadiene styrene) using an injection molding process. During manufacture, a collection of colored or uncolored ABS pellets may be heated, for example, to approximately 420 degrees Fahrenheit, and injected into a mold. The mold may be kept at around 85 degrees Fahrenheit, and the clamping pressure may be higher than 24 tons. Depending upon design concerns, bases 102 and 104 may be manufactured to relatively tight or relatively lenient tolerances. For example, in some circumstances, the allowable tolerances could be in the order of about two to eight thousands of an inch.

As depicted, system 100 also includes bands 106 and 108, which are connected to bases 102 and 104 respectively. As described below, the connections may be fixed or removable. As shown, bands 106 and 108 may be formed in several ways and from several different types of materials. For example, a designer may want to form bands 106 and 108 from one or more strands of an elastic material, such as an elastic polymer, natural rubber, synthetic rubber, etc. bound together by a fabric covering. A designer may choose natural rubber to take advantage of its extensibility (the ability to be extended), resilience (the ability to regain its original shape after being extended), and tensile strength (the ability to be extended under load without breaking). A designer may also choose a synthetic rubber, such as neoprene, which might be less expensive, have better resistance to air and the ultraviolet radiation in sunlight, but can have less resilience and tensile strength. If a designer chooses to have a fabric covering at all, the covering may include, for example, one or more layers of braided cotton or nylon yarn.

Bands 106 and 108 may be the same or different sizes. The bands may have a near uniform or non-uniform diameter and shape. For example, the cross section of a band may be circular, elliptical, square, etc. In addition, the cross section may change as you move along the band creating, for example, a ridged or wavelike appearance. In one embodiment, the band cross section may have a diameter of between ⅛ and ½ of an inch. The bands may be formed, for example, into a circle that has a diameter between 2 and 4 inches. In some embodiments, the bands may be formed into a complete and closed loop. The bands could also be formed in a manner that includes a metal or plastic crimping mechanism that closes the bands into a complete loop. In a pool use embodiment, a designer may choose materials and sizes that allow for durable products, safe play, and a snug fit around a Noodle. For example, the designer may choose to make a band from a material that withstands sunlight and chlorinated water. The size of the band's loop may be chosen to ensure a snug fit over a noodle while at the same time ensuring that the band cannot easily be stretched enough to fit over a child's head and thereby create a health hazard. For example, a band may be designed such that the expanded circumference of the band is equal to or less than fourteen inches. In some cases, the expanded circumference of the band could be less than ten inches.

While bases 102 and 104 appear to be similar, there may be differences. For example, a designer may elect to create a two-sided system including two bases that snap together. As depicted, base 102 includes a split shaft 110 with locking shoulders. In practice, split shaft 110 can be pressed into and through hole 112 in order to permanently connect or removably connect bases 102 and 104. Once connected, the locking shoulders of split shaft 110 may engage one or more surfaces of base 104—holding the two bases together in a snapped together orientation. In practice, bases 102 and 104 may be connected such that the two bases can rotate relative to one another. As described below, the bases may include one and/or two way ratcheting structures 103 that allow the bases to snap into different rotatably related positions. In some embodiments, the locking shoulders of split shaft 110 may engage a recessed and/or countersunk surface 105 of base 104. A countersunk design might allow bases 102 and 104 to be coupled such that split shaft 110 does not need to extend completely through hole 112 before connecting bases 102 and 104 together.

Bases 102 and 104 may also include band connection system 114 and 116 having a cradle to support and constrain the corresponding band. Systems 114 and 116 may be formed such that bands 106 and 108 are permanently connected or removably connected with their respective bases. As such, systems 114 and 116 may include interchangeable banding mechanisms as described more fully below. It should also be noted that a band connection system and a base can be formed as a unitary component, which may be formed using an injection molding process like the one described earlier.

As mentioned above, FIG. 2 depicts various views of an interconnection component 202 in combination with a Noodle 204. As shown, band 210 is sized such that it fits snugly around noodle 204. As depicted, Noodle 204 cannot easily slide through band 210, and band 210 is not so small as to significantly "bite into" noodle 204, which might potentially cause permanent deformation of noodle 204. Depending upon designer preferences, band 210 could be sized to provide more or less binding on noodle 204. In addition, the material and/or surface preparation of band 210 may be chosen to create more or less friction when fit around noodle 204. Some embodiments may desire a "slicker" less friction feel. Other embodiments might prefer a "stickier" high friction feel.

Figure 2:
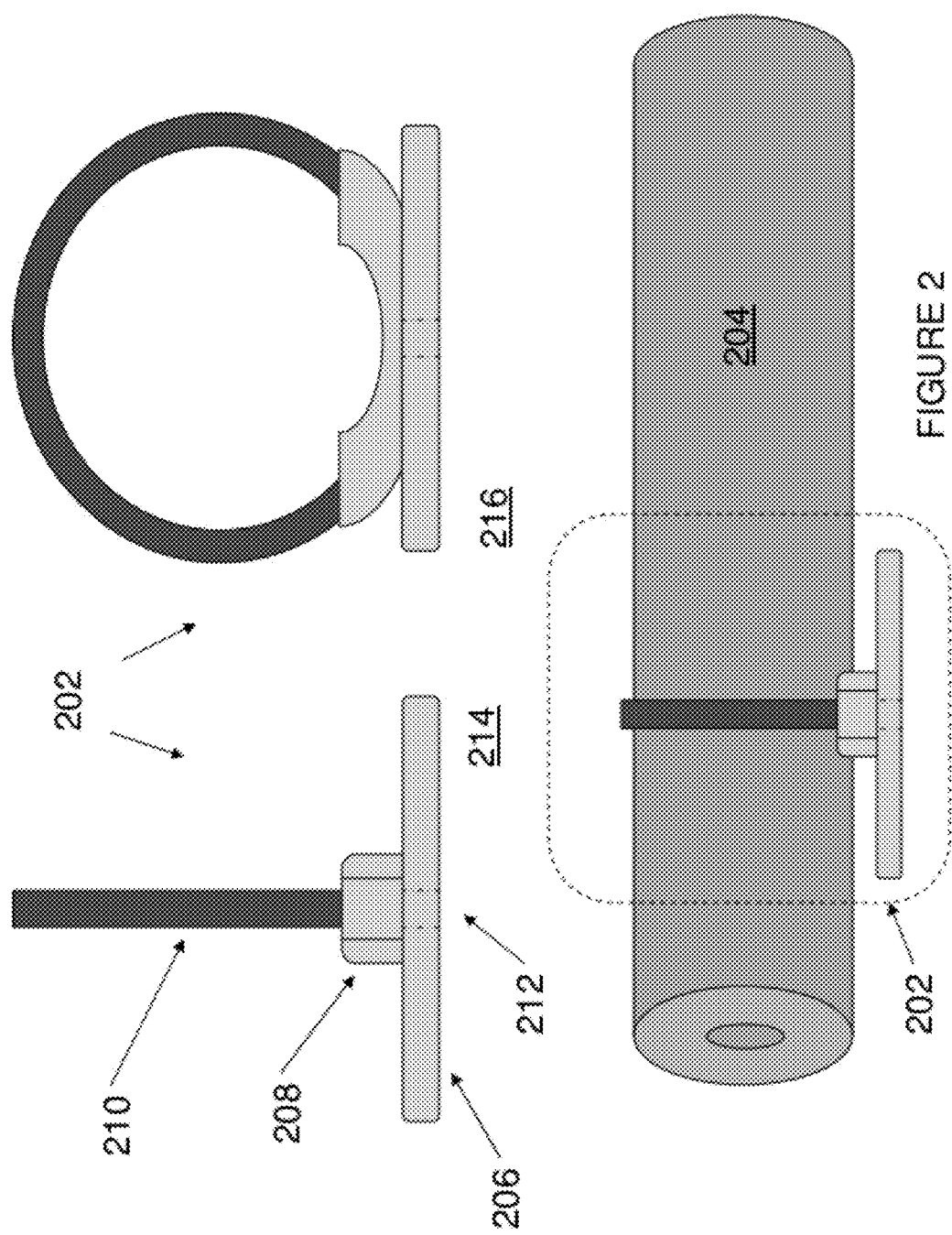
FIG. 2 depicts various views of a portion of an interconnection system in combination with a Noodle, the depicted portion and its Noodle engagement incorporates teachings of the present disclosure.

The depicted system of FIG. 2 and the technique used for Noodle engagement incorporate teachings of the present disclosure. As shown, component 202 includes a base portion 206, a band connection system 208, a band 210, and a hole 212 formed through the center of base portion 206. As depicted, view 214 and view 216 show the same component 202 from different perspectives. View 214 depicts a view rotated 90 degrees relative to view 216. It should also be noted that while band 210 is fixed in size, a designer might choose to implement a different banding system that allows for size adjustment. For example, in some embodiments, band 210 may not be a completed or closed circle. In such an embodiment, band 210 may be more akin to the rubbery strap that is used in common swim goggles. Such a strap could have two tab ends that can be pulled through one or more slits located on a base portion and/or band connection system to tighten or loosen the strap's grip on a noodle.

Note that although FIG. 2 shows only a single Noodle 204, understand that multiple interconnection components in accordance with the teachings herein each can be adapted to one or more noodles. In this way, multiple interconnection components may be used to join together or configure multiple noodles in a variety of configurations, that can only be limited by one's imagination. For example, using different types of interconnection components disclosed herein, a user can configure multiple noodles into a variety of shapes, such as a lounge chair, in-pool float, a beer cooler, an in-pool table, among many other configurations. These different designs can be realized by using multiple interconnection components that can be joined together, e.g., via ratcheting or so forth, enabling easy rotation of the interconnection components and thus the corresponding noodles. In addition, as described herein, various interconnection components can be provided for moveable or rotatable insert mechanism into which a noodle can be inserted to provide a variety of different configurations of multiple noodles.

Figure 3:
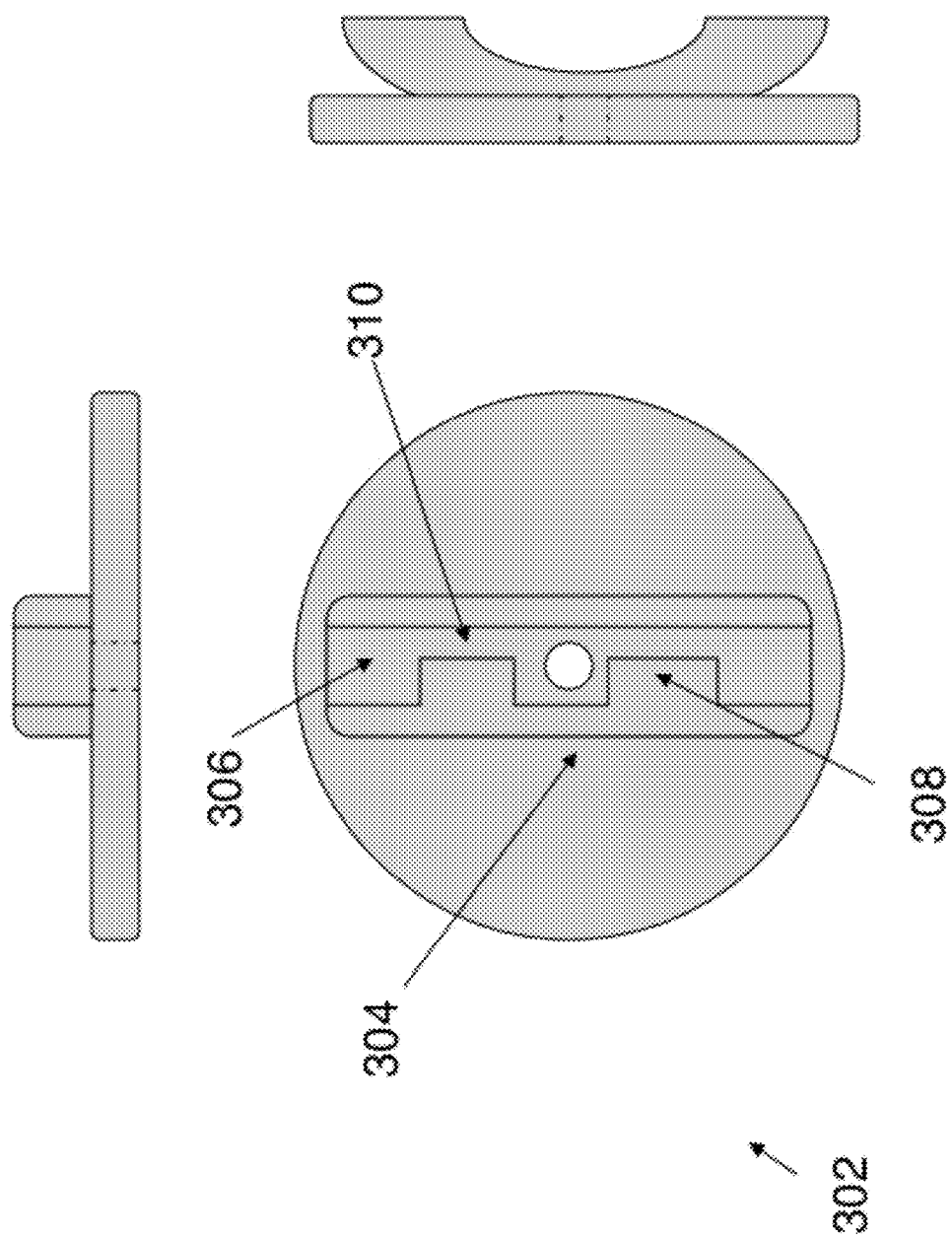
FIG. 3 depicts various views of an interconnection system with an interchangeable banding mechanism that incorporates teachings of the present disclosure.

Several mechanisms and techniques for connecting a band or strap to a base portion may be utilized without departing from the teachings disclosed herein. For example, FIG. 3 depicts various views of an interconnection system 302 with an interchangeable banding mechanism 304 that incorporates teachings of the present disclosure. In practice, mechanism 304 may include a channel 306 within which a portion of a band can rest. Mechanism 304 may also include one or more locking teeth 308 that extend over channel 306 and effectively maintain a loaded band within channel 306. As shown, mechanism 304 may have a narrower opening 310 that allows for the loading and unloading of a band. In practice, a band or a portion of a band may be stretched or oriented in a way that allows the band to be fitted through narrower opening 310 and into channel 306.

Figure 4:
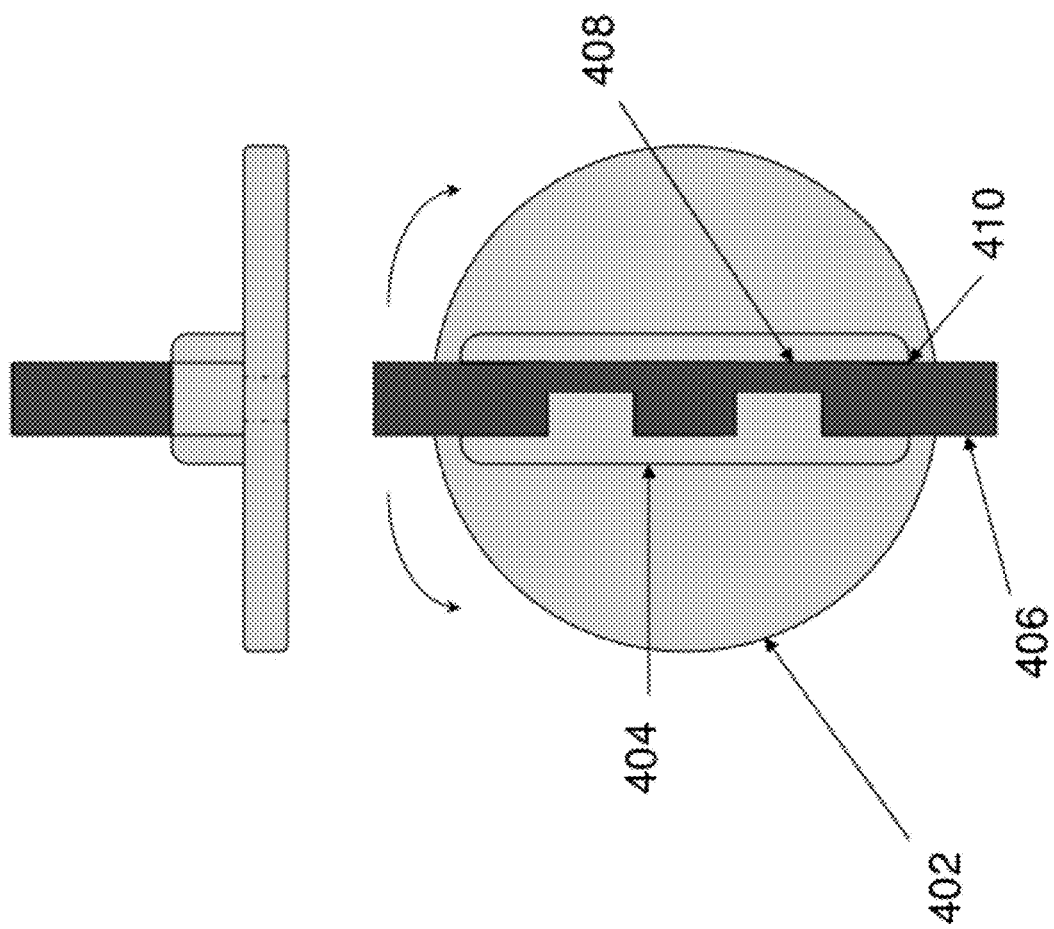
FIG. 4 depicts various views of an interconnection system with an interchangeable banding mechanism that incorporates teachings of the present disclosure.

Once inside channel 306, the band may be released and/or re-oriented such that locking teeth 308 help to keep the band within channel 306. Referring to FIG. 4, one of skill will recognize various views of an interconnection system 402 with an interchangeable banding mechanism 404 that incorporates teachings of the present disclosure. As depicted in FIG. 4, a portion of a band 406 is shown in a loaded position. That is, band 406 has been fitted through narrower opening 408 and (as depicted) rests within channel 410.

Figure 5:
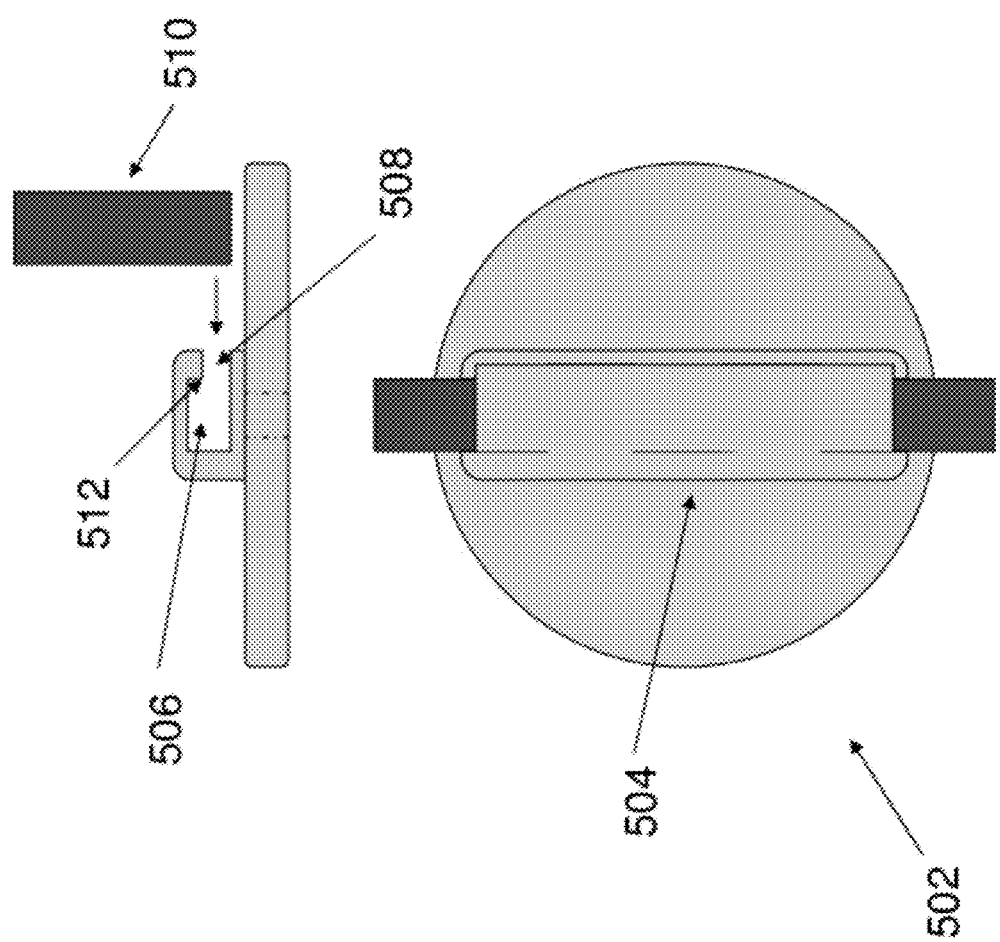
FIG. 5 depicts various views of an interconnection system with an interchangeable banding mechanism that incorporates teachings of the present disclosure.

FIG. 5 depicts various views of an interconnection system 502 with an interchangeable banding mechanism 504 that incorporates teachings of the present disclosure. As shown, mechanism 504 includes a channel 506 and a narrower opening 508. In practice, a portion of a band 510 can be fitted through narrower opening 508 and locked into channel 506 by an extended locking shoulder 512. Though the term "locked" is used, a designer may form mechanism 504 to allow for relatively simple loading and unloading of bands. For example, interconnection system components like system 502 and band 510 may come in many shapes, colors, materials, etc. A user may want to mix and match components to obtain a desired look and/or functionality for a system incorporating teachings of the present disclosure.

Figure 6:
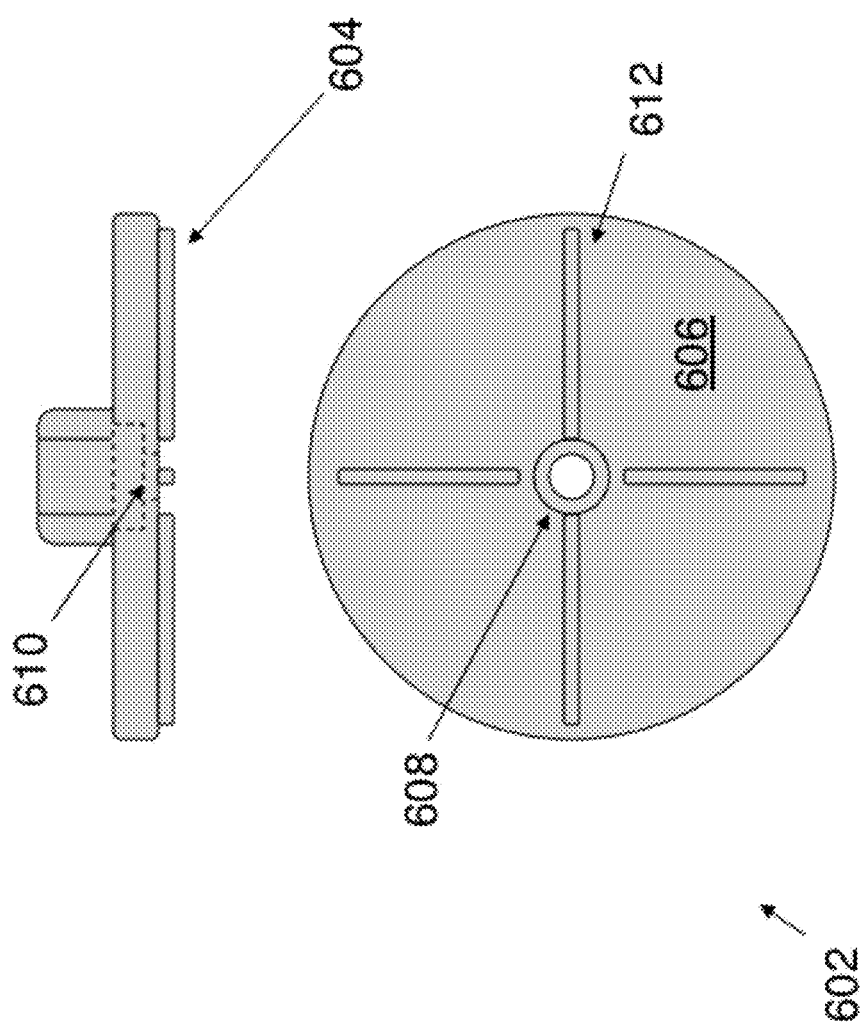
FIG. 6 depicts various views of an interconnection system with a bi-directional ratcheting mechanism that incorporates teachings of the present disclosure.

FIG. 6 depicts various views of an interconnection system 602 with a bi-directional ratcheting mechanism 604 that incorporates teachings of the present disclosure. As shown, system 602 shows a female base portion 606 with a hole 608 formed through it. As shown, hole 608 includes a counter sunk surface 610 on which a locking shoulder of a male base portion might lock. Portion 606 also includes four ridges 612 that make up a portion of the ratcheting mechanism 604. Though the image shows four ridges, more or less ridges may be used to create the desired amount of locking positions and the desired amount of locking pressure. For example, a designer may want to have two base portions, a male and a female portion, connect to one another using a split shaft and a hole like those depicted in FIG. 1. In addition, the designer may want the two bases to rotate relative to one another and to "lock" into one or more positions relative to one another. For example, as shown in FIG. 1, bands 106 and 108 would allow two noodles to be fitted into the bands such that the noodles are parallel to one another. If bases 102 and 104 were rotated 90 degrees relative to another, the noodles would appear to be perpendicular to one another. A designer may want to have "locking" positions that would allow a user to easily change from a parallel position to a perpendicular position. Similarly, the designer may want to give several intermediate options between parallel and perpendicular. Though many of the figures included with this disclosure show a split shaft with locking shoulders as a way to connect two bases, other techniques may be utilized. For example, a spring or a material with spring-like characteristics could be incorporated into the coupling mechanism. Such an addition may assist the designer in creating adjustable lock positions. In such an embodiment, a user may pull two connected bases away from one another. An included spring like mechanism may allow the bases to pulled enough to separate slightly (e.g., enough to reorient the bases into a different lock position) and then "spring" back into a lock position. One of skill in the art will recognize that additional or different coupling techniques may be used without departing from the spirit of the teachings disclosed herein.

Figure 7:
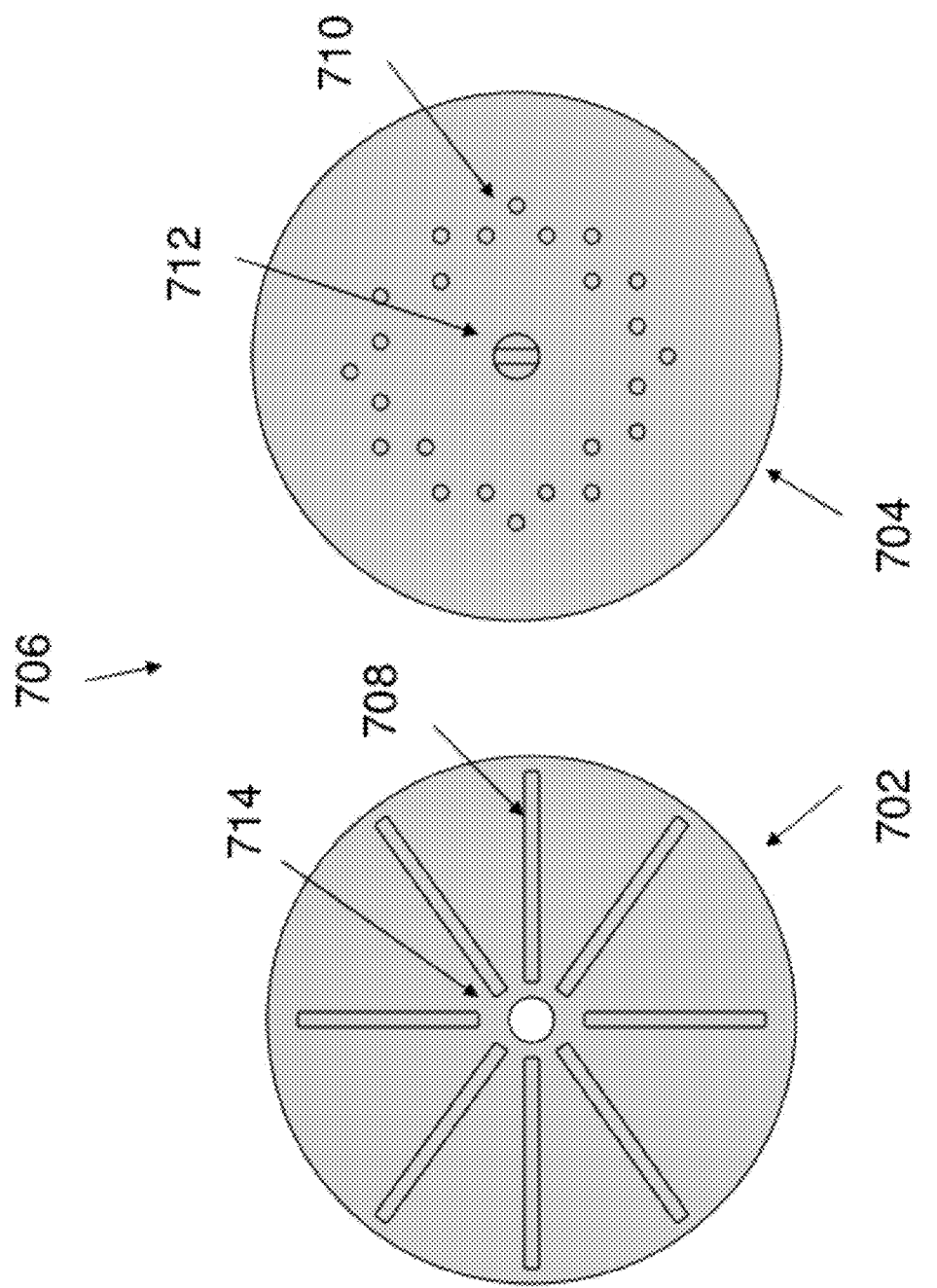
FIG. 7 depicts two component parts of an interconnection system with a bi-directional ratcheting mechanism that incorporates teachings of the present disclosure.

FIG. 7 depicts two component parts 702 and 704 of an interconnection system 706 with a bi-directional ratcheting mechanism that incorporates teachings of the present disclosure. In practice, the bi-directional ratcheting mechanism may include ridges 708 and locking bumps 710. The number and location of ridges 708 and bumps 710 may be chosen to dictate the number and orientation of "locking" positions. In addition, the number of ridges may also affect the "strength" of the locking position. For example, adding more ridges may make unlocking or rotating parts 702 and 704 relative to one another more difficult. One of skill in the art will also notice split shaft 712 on part 704 and hole 714 through part 702. The amount of "slop" between the locking shoulders of split shaft 712 and the surface of part 702 upon which the locking shoulders lock can also affect the "strength" of a given locking position. In a given embodiment, a designer may want to design a bi-directional ratcheting system that requires between 0.5 and 5 foot pounds or between 1.0 and 10.0 foot pounds of force to "unlock" from a given locking position. Other ranges may be chosen depending upon design goals.

Figure 8:
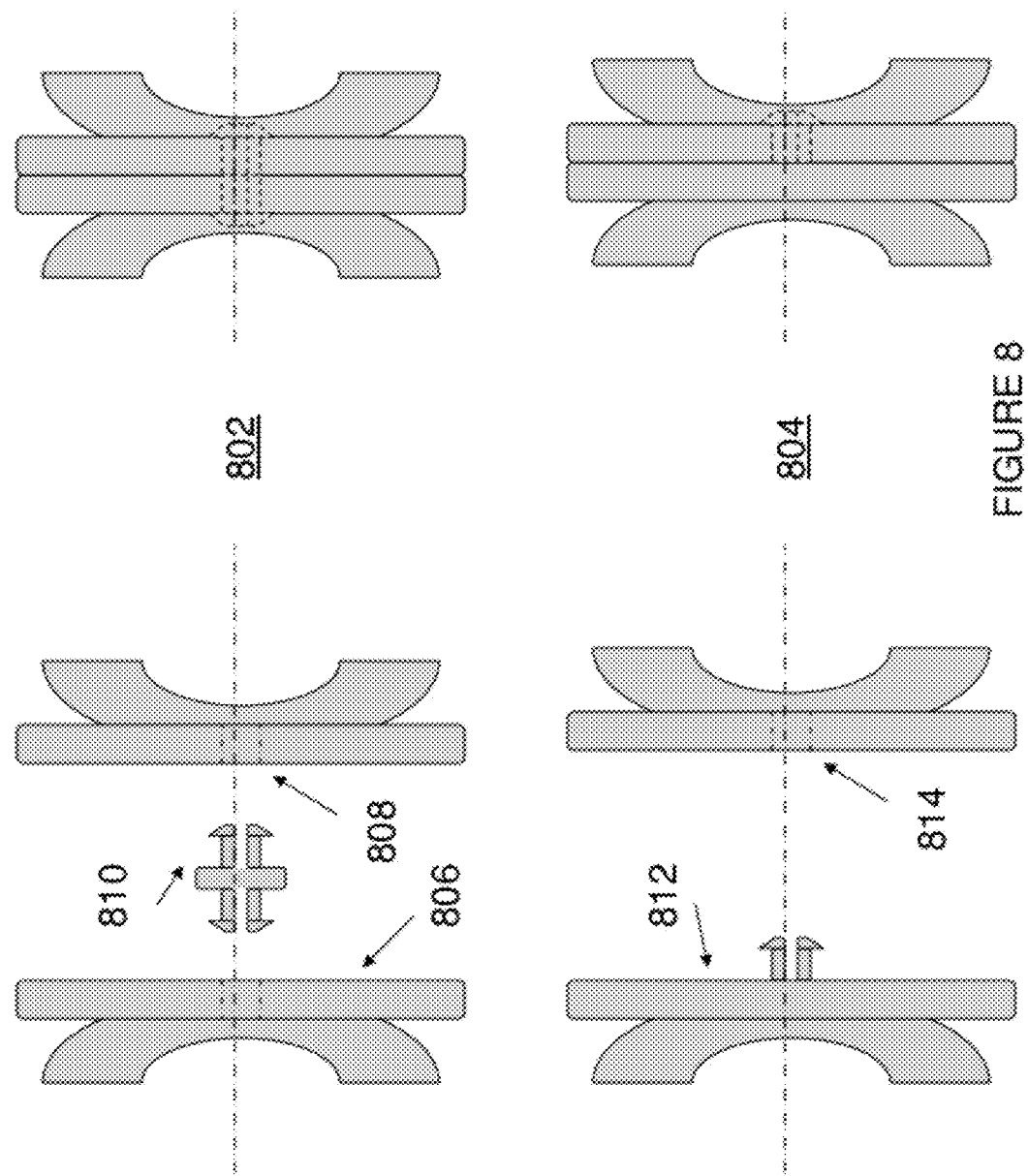
FIG. 8 depicts an exploded view of two interconnection systems, each of the depicted systems have component parts that snap together to form a two sided system and incorporate teachings of the present disclosure.

FIG. 8 depicts an exploded view of two interconnection systems 802 and 804. Each of the depicted systems has component parts that snap together to form a two-sided system that incorporates teachings of the present disclosure. As shown, system 802 is a three-piece system including two base portions 806 and 808, both of which include a band connection system. In addition to base portions 806 and 808, system 802 includes a two-headed split shaft connector 810. In such a system, base portions 806 and 808 are both female base portions in that they include a hole within which one end of split shaft connector 801 can fit. Interconnection system 804, on the other hand, depicts a two-piece system that includes a male base portion 812 and a female base portion 814.

Figure 9:
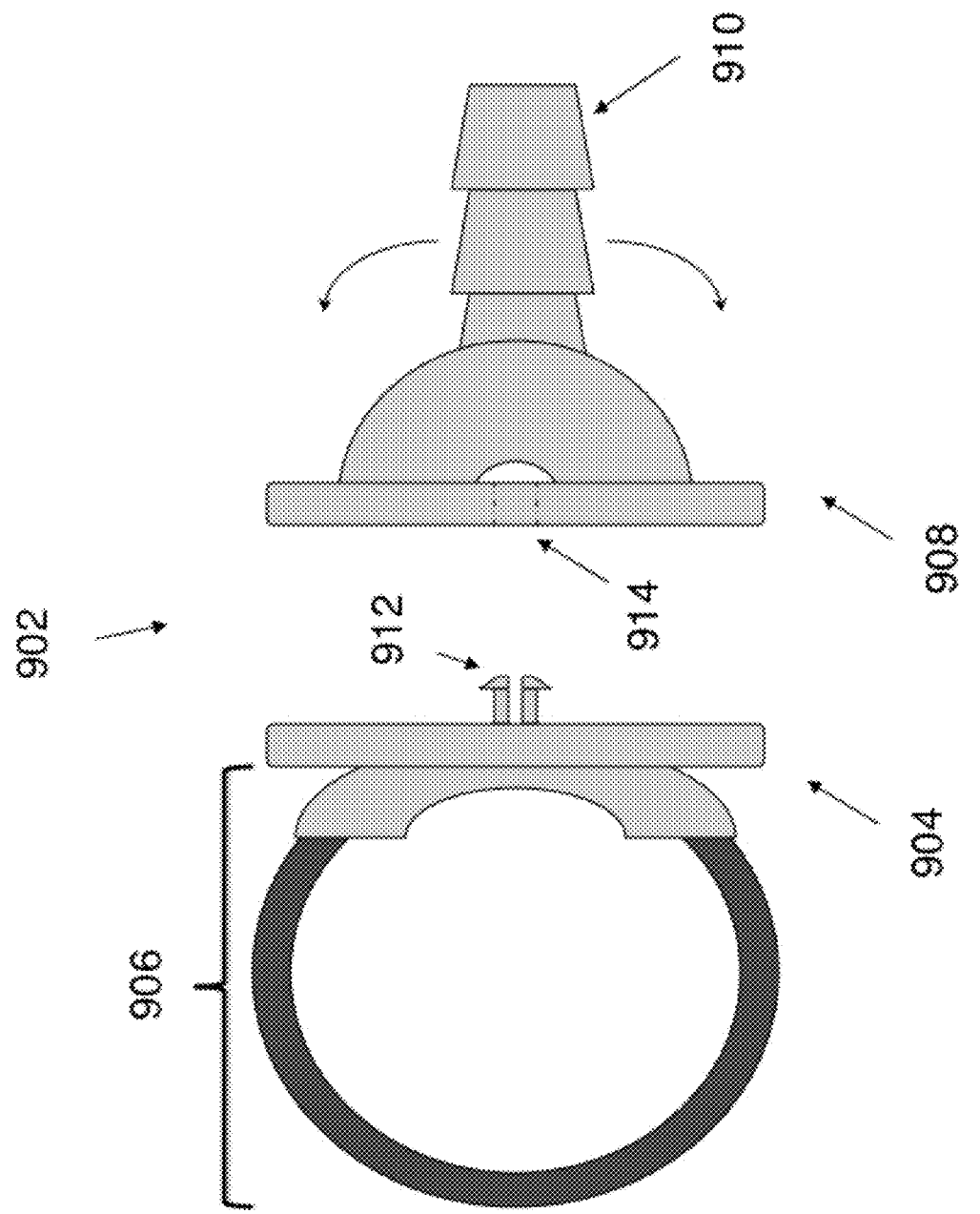
FIG. 9 depicts two component parts of an interconnection system that incorporates teachings of the present disclosure where one component includes a banding mechanism and the other includes a ribbed tube insert.

FIG. 9 depicts two component parts of an interconnection system 902 that incorporates teachings of the present disclosure where one component 904 includes a banding mechanism 906 and the other component 908 includes a ribbed tube insert 910. As shown, component 904 includes a male base portion with a split shaft 912. Component 908 includes a female base portion with a hole 914 formed there through. In the embodiment of FIG. 9, ribbed tube insert 910 is designed and sized to securely fit within an axial opening such as a center opening that runs through the middle of certain types of noodle tubes. In addition, tube insert 910 is configured to allow it to rotate about the female base portion, e.g., in at least an up and down direction. In some embodiments, tube insert 910 may rotate up and down as well as side-to-side. In other embodiments, tube insert 910 may be fixed in a single orientation. In other embodiments, tube insert 910 may rotate in multiple directions (e.g., tube insert 910 may be secured to base 914 with a ball in socket joint that allows tube insert 910 to take many positions.) One of skill in the art will recognize that several different mounting options can be utilized to connect tube insert 910 to base 914. Moreover, many such mounting options may be implemented in a manner that allows a user to "lock" tube insert 910 into a given location relative to base 914. One of skill will also recognize that bases 904 and 914 may utilize earlier and/or additional teachings to provide a bi-directional ratcheting feature.

Figure 10:
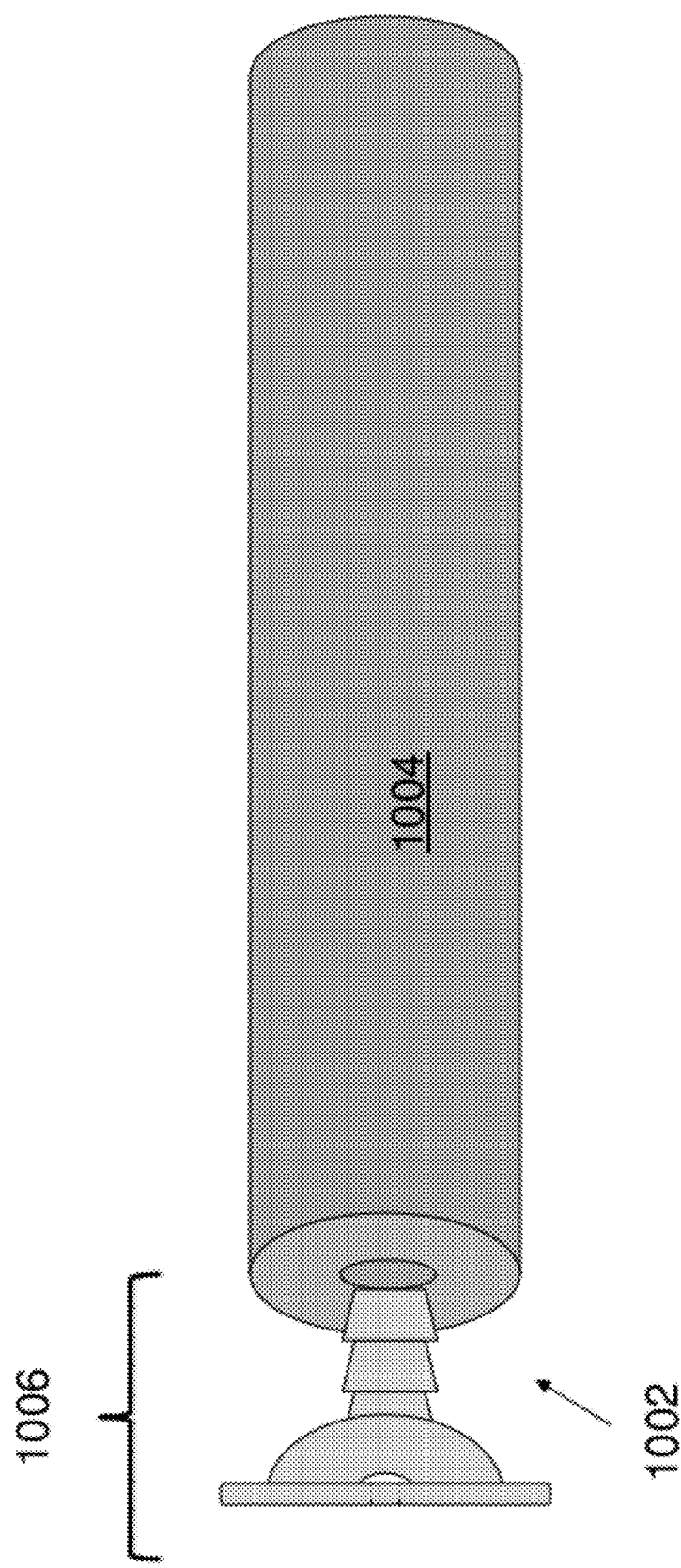
FIG. 10 depicts a portion of an interconnection system having a ribbed tube insert in combination with a Noodle, the depicted portion and its Noodle engagement incorporates teachings of the present disclosure.

A better understanding of how a tube insert might operate can be gleaned from FIG. 10. FIG. 10 depicts a portion of an interconnection system having a ribbed tube insert 1002 in combination with a Noodle 1004. The depicted portion 1006 of a tube interconnection system and Noodle 1004 show an engagement concept that incorporates teachings of the present disclosure. In practice, noodle 1004 may be cylindrical in shape and have a hole that runs at least partially through the length of noodle 1004. To attach noodle 1004 to tube insert 1002, a user may press noodle 1004 onto insert 1002 to releasably lock noodle 1004 to insert 1002. One skilled in the art will recognize that portion 1006 may be combined with an additional portion of an interconnection system—much like the system depicted in FIG. 9 or FIG. 11.

FIG. 11 depicts two component parts 1102 and 1104 of an interconnection system 1106 that incorporates teachings of the present disclosure. Component 1102 includes a banding mechanism 1108, and component 1104 includes two ribbed tube inserts 1110 and 1112. As shown, component 1102 includes a base portion 1114 that has a split shaft 1116. Component 1104 includes a base portion 1118 with a hole 1120 formed through its center that may allow for components 1102 and 1004 to be releasably snapped together and rotated relative to one another.

Although only a few exemplary embodiments have been described in detail above, those skilled in the art will readily appreciate that many modifications are possible in the exemplary embodiments without materially departing from the novel teachings and advantages of the embodiments of the present disclosure. By way of example, though several depictions include a tube having a generally circular cross-section, other shapes and configurations could be used. For example, tubes could have a star shaped cross section, an elliptical cross section, a cross section with a wavy outer edge, etc. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures. Moreover, the drafters of this disclosure explicitly use "means for" language in the claims when making use of a means-plus-function clause.

The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive. For example, though the figures depict a band-based mechanism and a tube insert based mechanism for coupling a noodle to a tube interconnection system component, other tube connection systems may be utilized. In addition, though many of the figures depict two base portions of interconnection system components snapped together, systems could be implemented with other numbers of base portions. And, those base portions may or may not be connected to one another. Additionally, a user may elect to create relatively complex structures using multiple tubes and multiple tube interconnection systems. For example, a user might take six or more tubes along with two two-sided interconnection systems per tube to create a hollow sphere like structure where two tubes make up the circumference of the hollow sphere.

Certain features that may be, for the sake of clarity, described herein in the context of separate embodiments, may also be provided in combination in a single embodiment. Conversely, various features that are, for brevity, described in the context of a single embodiment, may also be provided separately or in any sub-combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A tube interconnection system, comprising:
a first interconnection component comprising a first base portion including a split shaft extending therefrom, wherein the split shaft comprises at least one locking shoulder, the first interconnection component further comprising a first band connection system having a cradle to support and constrain a first band connected to the first band connection system;
a second interconnection component comprising a second base portion having a hole formed at least partially there through, wherein the second base portion includes a surface that is configured to interact with the at least one locking shoulder when the first interconnection component and the second interconnection component are in a coupled state, the second interconnection component further comprising a second band connection system having a cradle to support and constrain a second band connected to the second band connection system, the second band formed into a substantially circular configuration, wherein the substantially circular configuration maintains a fixed diameter that is less than four inches; and
a ratcheting mechanism configured to releasably hold the first interconnection component and the second interconnection component in a plurality of rotated positions relative to one another in the coupled state.

2. The tube interconnection system of claim 1, wherein the first interconnection component is a unitary component formed from an ABS plastic.

3. The tube interconnection system of claim 1, further comprising the first band and the second band.

4. The tube interconnection system of claim 3, wherein the first and second bands are configured to fit about a circumference of a tube.

5. The tube interconnection system of claim 3, wherein the first band is adapted to fit about a first pool noodle and the second band is adapted to fit about a second pool noodle.

6. The tube interconnection system of claim 1, wherein the hole is formed through the second base portion and the surface is formed by a countersunk surface extending around the hole.

7. A tube interconnection system, comprising:
a first interconnection component comprising a first base portion having a split shaft, wherein the split shaft comprises at least one locking shoulder, the first interconnection component further comprising a first band connection system having a cradle to support and constrain a first band connected to the first band connection system, the first band a complete and closed loop and which maintains a substantially circular shape;
a second interconnection component comprising a second base portion having a hole formed at least partially there through, wherein the second base portion includes a surface that is configured to interact with the at least one locking shoulder when the first interconnection component and the second interconnection component are in a coupled state, the second interconnection component further comprising a second band connection system having a cradle to support and constrain a second band connected to the second band connection system, the second band a complete and closed loop and which maintains a substantially circular shape; and
a ratcheting mechanism configured to releasably hold the first interconnection component and the second interconnection component in a plurality of rotated positions relative to one another in the coupled state.

* * * * *